United States Patent
Park et al.

(10) Patent No.: US 11,471,715 B2
(45) Date of Patent: Oct. 18, 2022

(54) SECONDARY BATTERY CHARGING-DISCHARGING DEVICE AND SECONDARY BATTERY ACTIVATION PROCESS DEVICE COMPRISING SAME

(71) Applicant: LG CHEM, LTD., Seoul (KR)

(72) Inventors: Hyo Jin Park, Daejeon (KR); Joon Sung Bae, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 421 days.

(21) Appl. No.: 16/618,972

(22) PCT Filed: Dec. 28, 2018

(86) PCT No.: PCT/KR2018/016904
§ 371 (c)(1),
(2) Date: Dec. 3, 2019

(87) PCT Pub. No.: WO2019/139293
PCT Pub. Date: Jul. 18, 2019

(65) Prior Publication Data
US 2020/0139168 A1    May 7, 2020

(30) Foreign Application Priority Data
Jan. 12, 2018  (KR) .................. 10-2018-0004627

(51) Int. Cl.
*A62C 2/10*     (2006.01)
*H01M 4/04*    (2006.01)
(Continued)

(52) U.S. Cl.
CPC ............. *A62C 2/10* (2013.01); *H01M 4/04* (2013.01); *H01M 10/04* (2013.01); *H02J 7/007* (2013.01)

(58) Field of Classification Search
CPC ................... H01M 4/04; H01M 10/04
See application file for complete search history.

(56) References Cited

U.S. PATENT DOCUMENTS 5,562,538 A * 10/1996 Suyama ............... B60L 53/14
                                                         454/75
2012/0187910 A1   7/2012 Lee
(Continued)

FOREIGN PATENT DOCUMENTS

CN    102749587 A    10/2012
CN    103782444 A     5/2014
(Continued)

OTHER PUBLICATIONS

International Search Report (PCT/ISA/210) issued n PCT/KR2018/016904, dated Apr. 8, 2019.
(Continued)

*Primary Examiner* — Olatunji A Godo
(74) *Attorney, Agent, or Firm* — Birch, Stewart, Kolasch & Birch, LLP (57) ABSTRACT

A charging-discharging device for secondary battery and a secondary battery activation process device are provided. The charging-discharging device of the present invention includes a box-type body including two open parts formed at lateral surfaces thereof; charging-discharging terminals disposed on lateral surfaces of the body; a nonflammable blocking means for opening or closing the open parts at the lateral surfaces; an air conditioning line connected to the inside of the body to individually control the temperature of each charging-discharging device; and/or a $CO_2$ supply line for spraying carbon dioxide inside the body when a fire occurs. It is possible to uniformly control and manage the internal temperature of the charging-discharging device for performing an activation process of a secondary battery, and (Continued)

when a fire occurs, the fire can be immediately and efficiently extinguished and prevented from spreading to the outside.

13 Claims, 9 Drawing Sheets

(51) Int. Cl.
*H01M 10/04* (2006.01)
*H02J 7/00* (2006.01)

(56) References Cited

U.S. PATENT DOCUMENTS

| | | | | |
|---|---|---|---|---|
| 2012/0274268 | A1* | 11/2012 | Ishida | H02J 7/04 320/107 |
| 2013/0154352 | A1* | 6/2013 | Tokarz | B60L 3/0046 307/9.1 |
| 2014/0186668 | A1 | 7/2014 | Jung et al. | |
| 2015/0010783 | A1 | 1/2015 | He et al. | |
| 2016/0130709 | A1* | 5/2016 | Hong | H01M 8/1253 429/418 |

FOREIGN PATENT DOCUMENTS

| | | |
|---|---|---|
| CN | 204101524 U | 1/2015 |
| CN | 104603985 A | 5/2015 |
| CN | 104638296 A | 5/2015 |
| CN | 105518473 A | 4/2016 |
| JP | 10-308242 A | 11/1998 |
| JP | 2012-226915 A | 11/2012 |
| JP | 2013-178903 A | 9/2013 |
| KR | 10-0665380 B1 | 1/2007 |
| KR | 10-2012-0088219 A | 8/2012 |
| KR | 10-1193778 B1 | 10/2012 |
| KR | 10-2013-0134431 A | 12/2013 |
| KR | 102015-0034945 A | 4/2015 |
| KR | 10-2016-0051064 A | 5/2016 |
| KR | 10-2017-0093635 A | 8/2017 |
| KR | 10-2017-0103700 A | 9/2017 |

OTHER PUBLICATIONS

Extended European Search Report dated Jul. 2, 2020, for European Application No. 18899849.6.
Office Action mailed in CN Application No. 201880037747.0 dated Aug. 15, 2022.

* cited by examiner

SECONDARY BATTERY CHARGING-DISCHARGING DEVICE AND SECONDARY BATTERY ACTIVATION PROCESS DEVICE COMPRISING SAME

TECHNICAL FIELD

This application claims the benefit of priority based on Korean Patent Application No. 10-2018-0004627, filed on Jan. 12, 2018, and the entire contents of the Korean patent application are incorporated herein by reference.

The present invention relates to a charger/discharger of a secondary battery and an activation process apparatus of the secondary battery including the same, and more particularly, to a charger/discharger of a secondary battery capable of reducing measurement deviation of an activation process of the secondary battery due to the temperature deviation by uniformly controlling the internal temperature of the charger/discharger which performs the activation process.

BACKGROUND ART

As technology development and demand for mobile devices are increasing and the spread of electric vehicles is expanding, demand for secondary batteries as energy sources is rapidly increasing. Among them, demand for lithium secondary batteries having high capacity and energy density is especially high.

In general, a lithium secondary battery is manufactured by containing in an electrode assembly consisting of a negative electrode, a positive electrode, and a separator into a pouch-shaped case of a cylindrical or rectangular metal can or an aluminum laminate sheet, and injecting electrolyte into the electrode assembly. The lithium secondary battery manufactured as described above can function as a battery only by activating the battery by performing a predetermined charge/discharge. Such a process is called a formation process or an activation process. In this activation process, a charger/discharger is used. In the mass production process of secondary batteries, the charger/discharger is set to be capable of simultaneously charging and discharging a plurality of cells in order to increase productivity.

Figure 1:
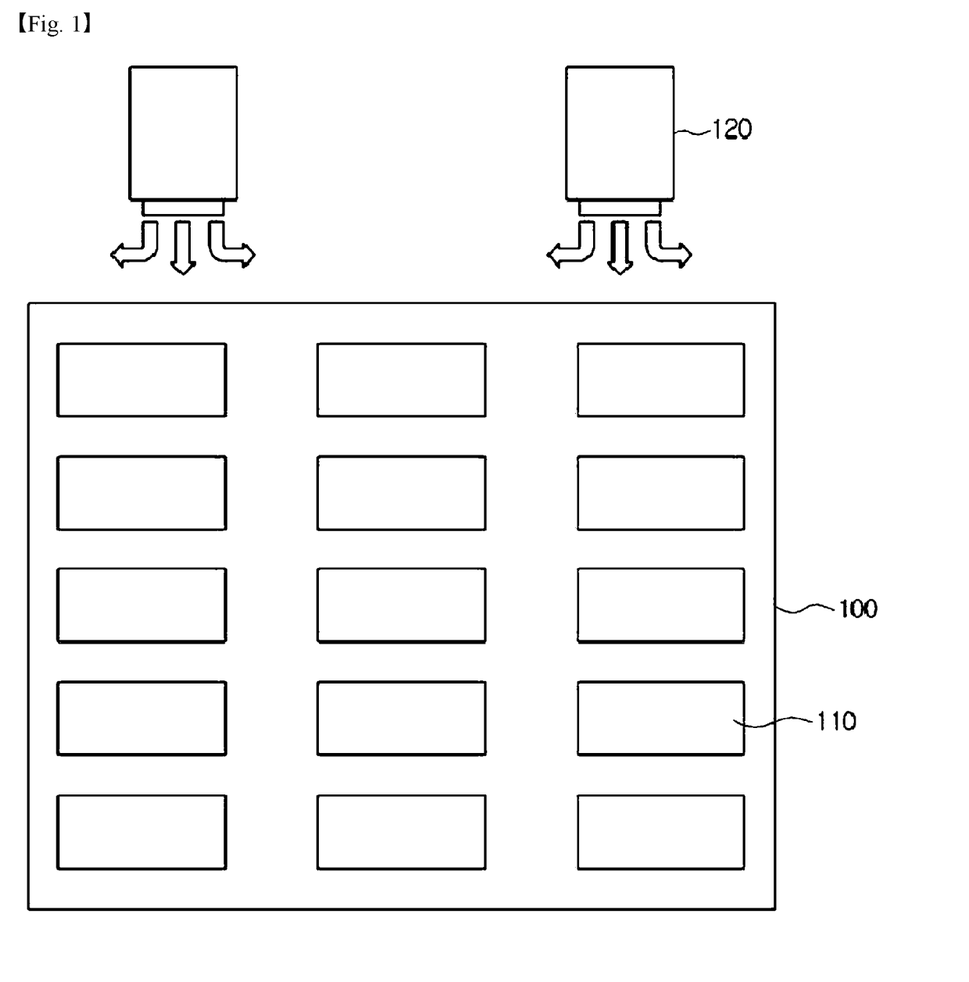
FIG. 1 is a front view schematically showing a conventional device for performing a large number of activation processes of a secondary battery.
Figure 2:
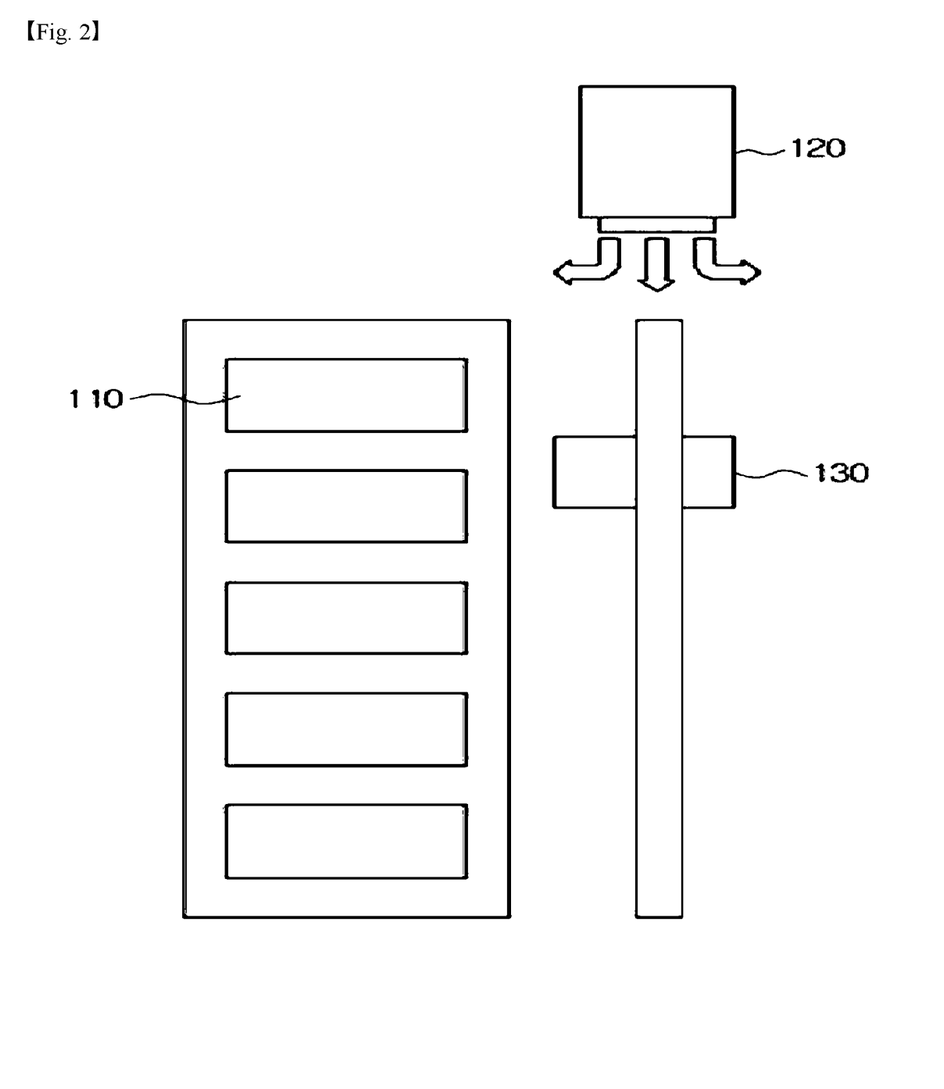
FIG. 2 is a side view of FIG. 1.

FIG. 1 is a front view schematically showing a conventional device for performing a large number of activation processes of a secondary battery, and FIG. 2 is a side view of FIG. 1. A plurality of chargers 110 are arranged in an activation process chamber 100, an air conditioning duct 120 is installed on the ceiling of the activation process chamber 100 in order to control the room temperature, and a certain space for each operator's maintenance walkway and the walkway of the stacker crane 130 is prepared in the front part and the rear part in which the plurality of chargers/dischargers 110 are arranged in layers.

Figure 3:
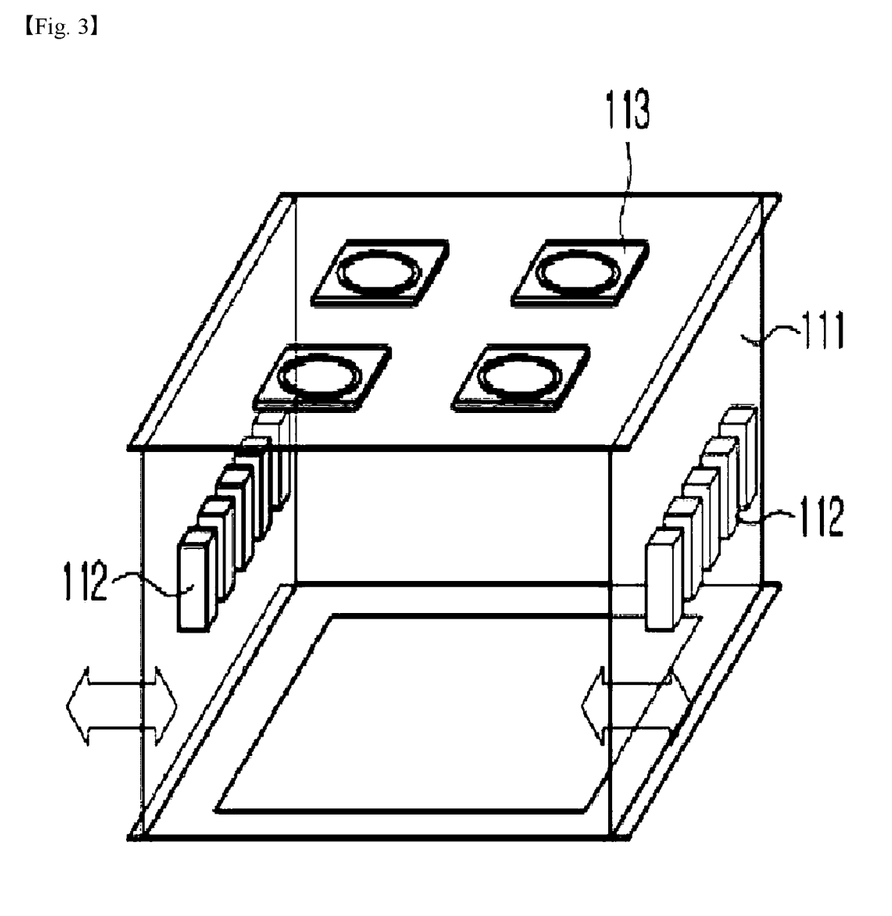
FIG. 3 is a perspective view schematically showing a charger/discharger used in a conventional apparatus shown in FIG. 1.

FIG. 3 is a perspective view schematically showing an enlarged example of a charger/discharger 110 used in the apparatus shown in FIG. 1. The illustrated conventional charger/discharger is equipped with charging/discharging terminals 112 on the left and right sidewalls of a box-type body 111 to thereby contact the electrode lead of a battery cell loaded in a tray (not shown), a fan 113 is installed in the ceiling of the body 111 to thereby cool the heat generated during the activation process, and the box-shaped body 111 has a structure in which two front and rear sides among four side surfaces are opened. Among these, the rear opening part becomes a passage for injecting or discharging the tray to the inside by a stacker crane, and the front opening part becomes a worker's work path when necessary. On the other hand, the bottom of the body is of an open type, but when the tray is inserted, it is seated and fixed thereto while closing the opening.

Here, during the activation process of the lithium secondary battery, there is a possibility that ignition or explosion may occur due to the characteristics of the battery, and as the capacity and energy density of the battery gradually become higher, the possibility and risk thereof increase, but conventionally, the fire extinguishing equipment is not properly provided in the activation process chamber or the activation process equipment, so when a fire occurs, a person should carry the fire extinguisher directly and extinguish the fire. In addition, since the conventional charging and discharging unit is open to the inside and the outside, when a fire is ignited in the battery at the activation process, the fire can be easily spread to the outside.

On the other hand, since lithium secondary batteries may vary greatly in performance depending on temperature, it is important to uniformly manage the temperature distribution. Since the activation process is simultaneously performed as places a plurality of trays in a process chamber and loads a plurality of battery cells in another tray. Hence, the temperature difference is present in the activation process chamber or between the various chargers/dischargers. In particular, in the conventional activation process chamber, the air conditioning duct is installed in the ceiling of the chamber, and the temperature difference is generated in the room according to the distance from the air conditioning duct. In addition, since the internal space of the charger/discharger is open, the external temperature deviation affects the interior as it is. Due to such a temperature deviation, a problem arises in that the battery capacity or the like is incorrectly measured or a measurement deviation occurs and measurement reliability is lowered. In order to prevent temperature deviation, a chamber type charger/discharger is preferable, but this is difficult to apply because of high production cost.

As described above, in the case of a conventional activation process apparatus and a charger/discharger, when a fire occurs, extinguishing cannot be performed properly, and there is a risk of the fire spreading to the outside. In addition, there is a problem that a temperature deviation occurs in the process chamber or between the charger/discharger, thereby causing frequent measurement deviations such as battery capacity.

DISCLOSURE

Technical Problem

Accordingly, the present invention is to solve the problems of the prior art as described above, and an object of the present invention is to provide a charger/discharger capable of properly extinguishing a fire when the fire occurs in an activation process apparatus or charger/discharger and capable of preventing the fire from spreading to the outside, and an activation process apparatus including the same.

Another object of the present invention is to provide a charger/discharger capable of increasing the measurement reliability of battery capacity, etc. by reducing the temperature variation among a plurality of battery cells which perform the activation process, and an activation process apparatus including the same.

Technical Solution

In an aspect, there is provided a charger/discharger of a secondary battery, the charger/discharger including: a body having a ceiling portion; a bottom portion; a side portion extending between the ceiling portion and the bottom portion; a charge/discharge terminal configured to apply an electric current when contacting an electrode lead of a battery cell when a tray having a plurality of battery cells loaded thereon is provided at the side portion of the body; and a non-combustible blocker at each of the openings of the side portion to open and close each of the openings of the side portion.

The non-combustible blocker can be opened when the tray is put into or discharged from the inside of the charger/discharger, and can be blocked when the tray is charged/discharged. In the case of a fire, if the non-combustible blocker is made of a material that does not burn well, it can be made of any one of known materials without particular limitation, but may preferably be in the form of a door or a curtain, more preferably a non-flammable curtain.

Further, it is preferable that the non-combustible blocker is configured to automatically close when a tray is input for charging/discharging of a secondary battery and is configured to automatically opened open when charging/discharging is completed. The non-flammable curtain can be designed to be opened and closed vertically or horizontally, but the vertical open-close type is more preferable. In this case, if a magnet is provided at the lower end of the curtain, a stable sealed state can be form, which is preferable.

In another aspect, there is provided an air conditioning line connected to an inside of the body to control a temperature of the charger/discharger; and a $CO_2$ supply line to inject $CO_2$ into the body when a fire occurs.

Herein, the air conditioning line and the $CO_2$ supply line are configured to be joined into one line through an open-close valve, the one line being in communication with the inside of the body. If the open-close valve is configured to close the air conditioning line and open a $CO_2$ supply line by sensing the fire when there is a fire, the fire can be automatically extinguished at the beginning of the fire, which is desirable.

It is preferable to install a fan in the ceiling portion of the body so that the air supplied through the air conditioning line is smoothly supplied to the inside of the charge/discharge device. Here, a flat fan may be used, or a blower fan may also be used.

In the case of using the blower fan, if the air conditioning line and the CO2 supply line are connected to the intake port of the blow fan, the internal temperature can be controlled and a fire can be smoothly extinguished.

In another aspect, there is provided an activation process apparatus of a secondary battery, including: a charger/discharger set in which two or more chargers/dischargers of the secondary battery described above are arranged; an air conditioning device connected to the air conditioning line of each of the chargers/dischargers to control a temperature; and a CO2 supply source connected to the CO2 supply line of each of the chargers/dischargers to inject $CO_2$ when a fire occurs.

Advantageous Effects

According to the present invention, since a non-combustible blocking means for blocking the inside of the charger from the outside is provided, the temperature is not affected by the external temperature variation during the activation process, to thereby maintain a uniform temperature, and in the event of a fire, the fire can be prevented from being spread to the outside. In addition, since an air conditioning line and a $CO_2$ supply line are connected to each other for each charger/discharger, the internal temperature can be regulated uniformly and smoothly, and in the event of a fire, the $CO_2$ supply line may be opened so that the extinguishing work can be efficiently performed immediately. As such, in the charger/discharger according to the present invention, it is possible to reduce the measurement deviation due to the temperature deviation by maintaining the internal temperature uniformly at a predetermined temperature, and to effectively extinguish the fire immediately and prevent the fire from being spread to the outside.

DETAILED DESCRIPTION OF THE PREFERRED EMBODIMENTS

Hereinafter, the present invention will be described more specifically with reference to the accompanying drawings about exemplary embodiments of the present invention. It is to be understood that the following detailed description and drawings are merely illustrative of the embodiments of the present invention, and therefore the present invention should not be construed as being limited to the description and contents.

Meanwhile, in the present invention, terms such as 'front', 'rear', 'left', 'right', 'upper' and 'lower' are used, but these terms are used on the basis of the drawings shown for ease of explanation and easy understanding. It is to be understood that they are used in the sense of relative relationship and not in the sense of absolute relationship, and these terms should not be unduly construed to limit the scope of the present invention.

The present invention provides a charger/discharger of a secondary battery and an activation process apparatus of a secondary battery including the same, but for convenience of description, first, an activation process apparatus of a secondary battery according to the present invention will be described in detail.

Figure 4:
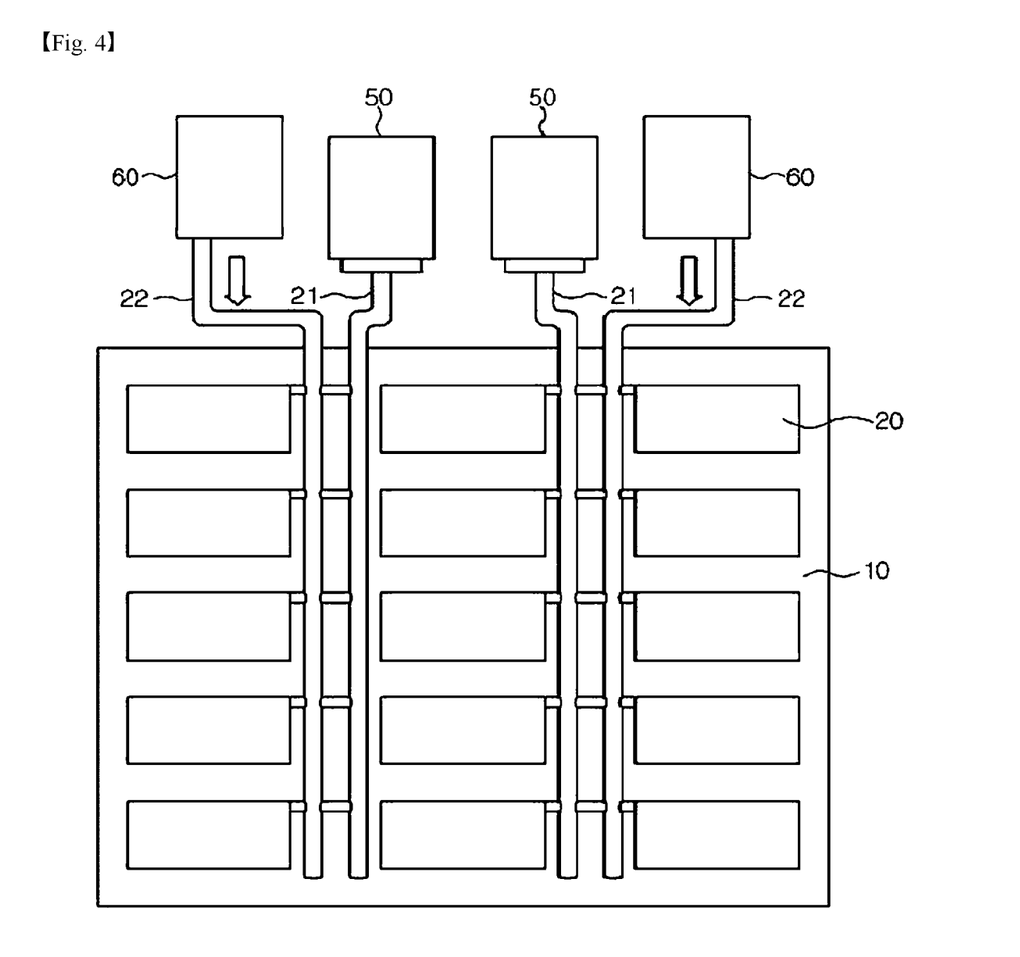
FIG. 4 is a front view schematically showing a processing apparatus for activating a secondary battery according to a preferred embodiment of the present invention.
Figure 5:
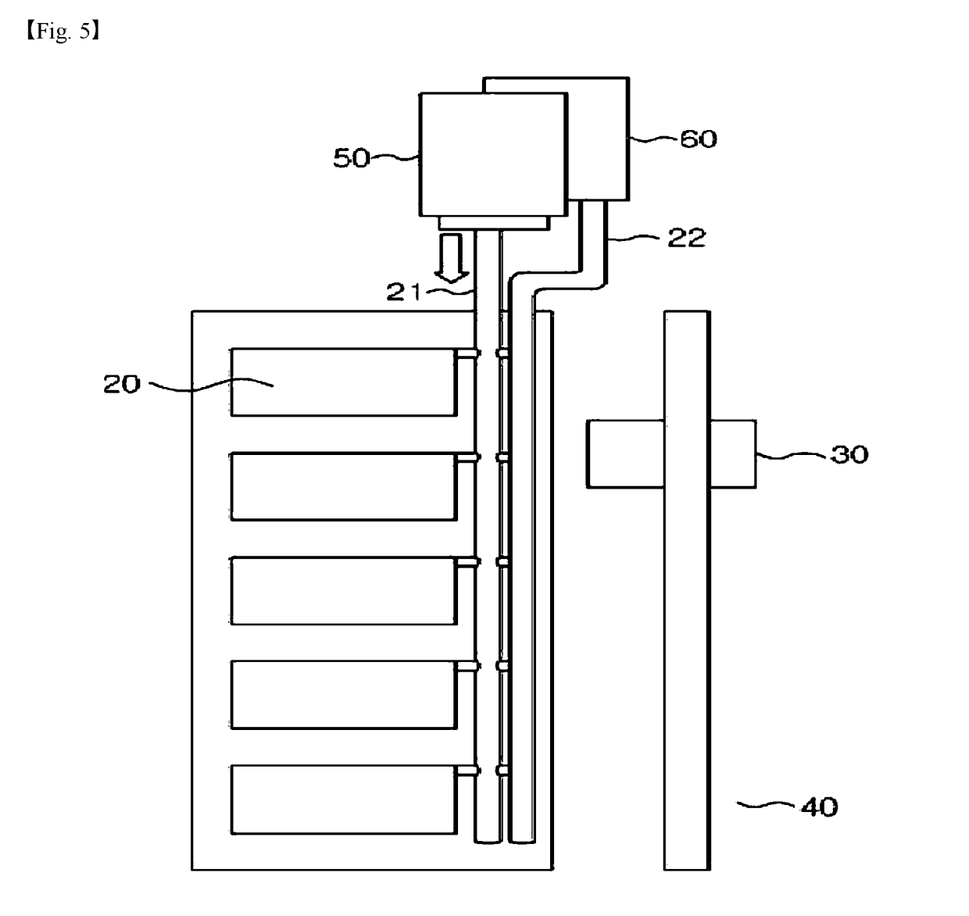
FIG. 5 is a side view thereof.

FIG. 4 is a front view schematically showing a processing apparatus for activating a secondary battery according to a preferred embodiment of the present invention, and FIG. 5 is a side view thereof. Referring to these drawings, as in the conventional apparatus, in the activation process chamber 10, the plurality of chargers/dischargers 20 are arranged side by side in the horizontal and vertical directions, and a predetermined space is provided in the front part (the left part in the side view of FIG. 5) of the row in which the plurality of chargers/dischargers 20 are arranged and becomes the maintenance passage of the worker, and a space provided in the rear part (right side in the side view of FIG. 5) becomes the moving passage 40 of the stacker crane 30. In the side view of FIG. 5, the chargers/dischargers 20 are arranged in one row in the horizontal direction, but may be arranged in a plurality of rows.

In addition, in the activation process apparatus of the present invention, an air conditioning duct 50 connected to an air conditioning device (not shown) is installed on the ceiling of the process chamber similarly to the conventional art, and the air conditioning duct 50 is connected to each charger/discharger 20 through a separate air conditioning line 21.

In addition, the process apparatus of the present invention has a structure in which a $CO_2$ supply source 60 is installed and connected to each charger/discharger 20 through a $CO_2$ supply line 22. Although it is illustrated that two $CO_2$ supply sources 60 are installed in the process chamber 10, they may be installed outside the process chamber or may be connected to both sides by installing one $CO_2$ supply source 60.

As described above, in the activation process apparatus according to the present invention, an air conditioning line is connected for each charger/discharger to thereby uniform and smooth internal temperature control. In addition, an additional $CO_2$ supply line is installed in the apparatus so that in the event of a fire inside the charger/discharger, the $CO_2$ supply line can be opened instead of the air conditioning line to thereby efficiently perform extinguishing work immediately. This will be described in detail later with reference to the charger/discharger described later.

Figure 6:
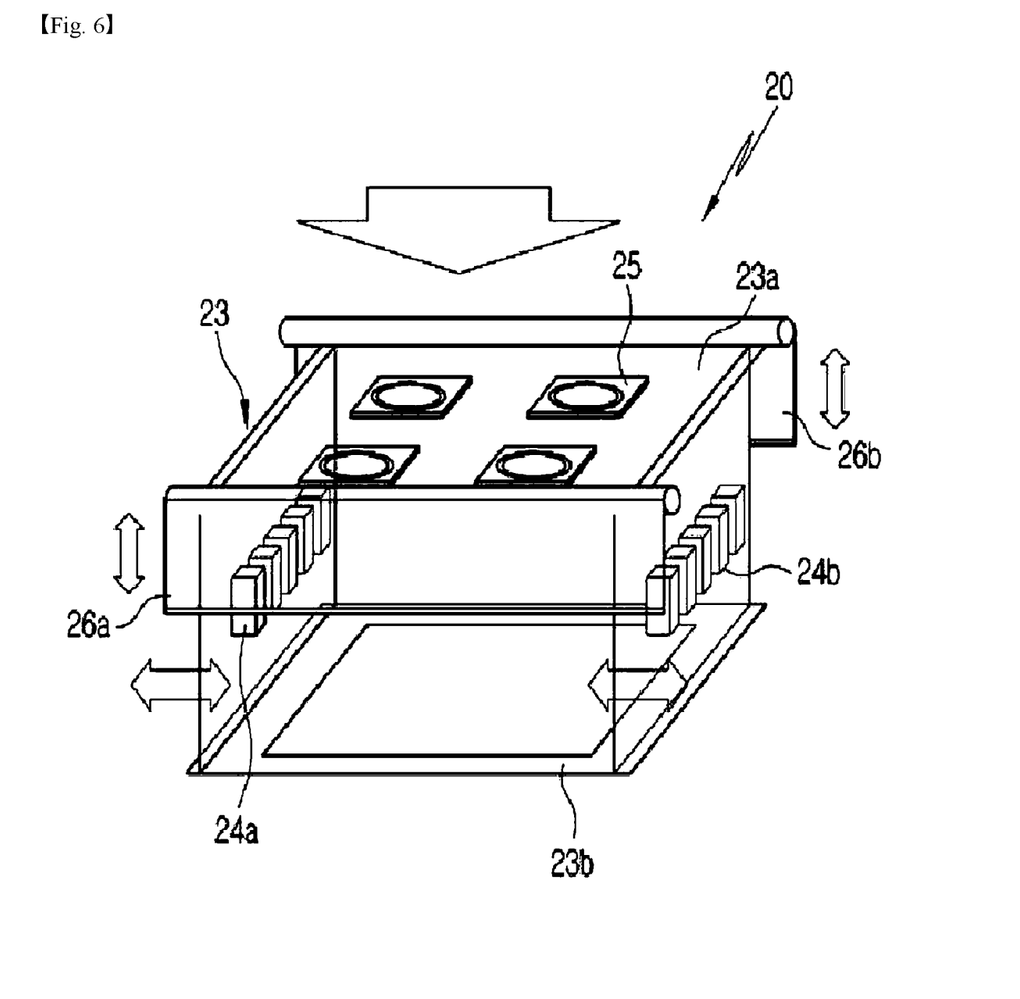
FIG. 6 is a perspective view schematically showing a charger/discharger of a secondary battery according to an embodiment of the present invention.
Figure 7:
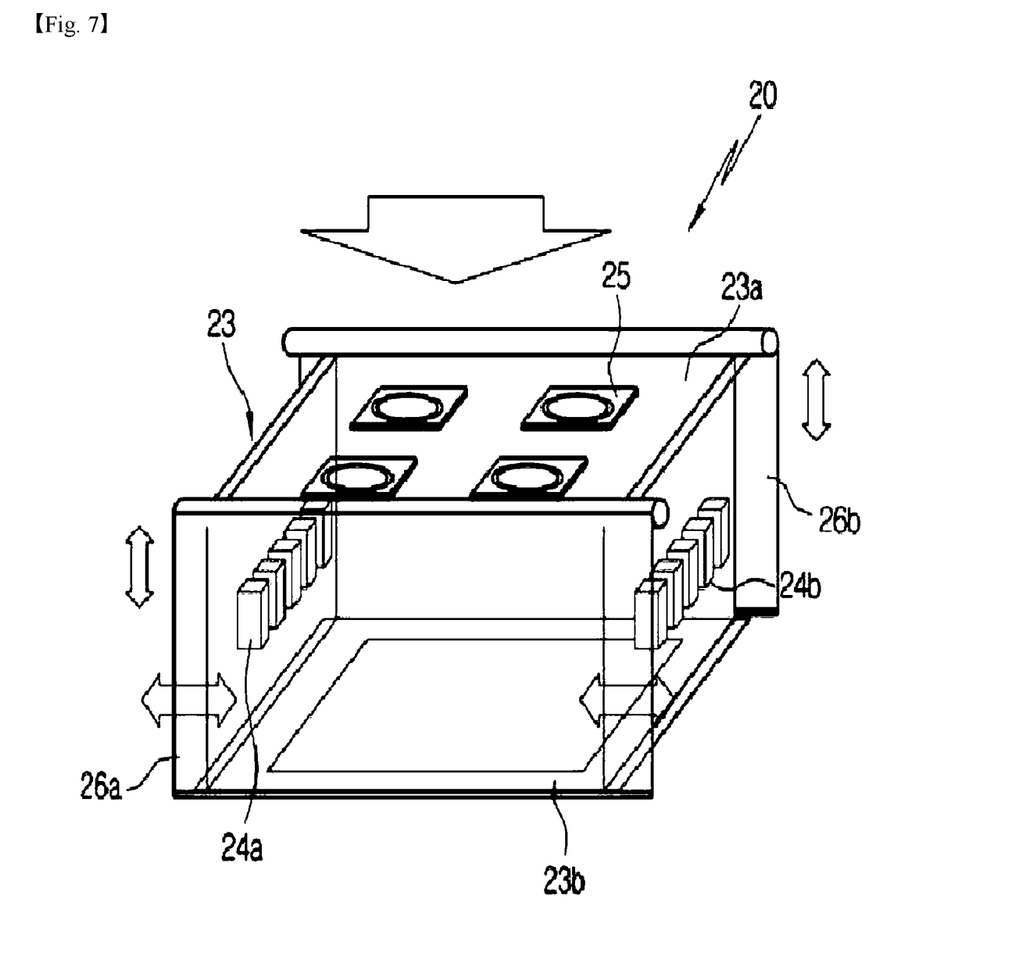
FIG. 7 is a perspective view illustrating the charger/discharger shown in FIG. 6 in a charged/discharged state.

FIG. 6 is a perspective view schematically showing a charger/discharger 20 of a secondary battery according to an embodiment of the present invention, and FIG. 7 is a perspective view illustrating the charger/discharger shown in FIG. 6 in a charged/discharged state. Referring to these drawings, the charger/discharger 20 of the present invention includes a conventional box-shaped body 23, charge/discharge terminals 24a and 24b provided on the side portion of the box-shaped body 23, and a fan 25 provided in a ceiling portion 23a of the box-shaped body 23 similarly to a conventional art. The box-shaped body 23 includes a ceiling portion 23a, a bottom portion 23b, and a side portion, and since two front and rear sides of the side portion are open, the rear open portion becomes a passage for injecting or discharging a tray (not shown) to the inside by the stacker crane 30, and the front open portion becomes a worker's work passage when checking the charger/discharger or when a manual work is necessary. The bottom portion 23b of the body is open, and the tray is seated and fixed to this open portion. The charge/discharge terminals 24a and 24b apply current by contacting electrode leads of battery cells mounted in a tray (not shown), and the fan 25 cools heat generated during an activation process.

The charger/discharger of the present invention is further provided with a non-combustible blocking means capable of opening and closing the two side openings in the box-shaped body 23 as described above. Here, the non-combustible blocking means can be opened when the tray is put in or discharged inside the charger/discharger and can be blocked when charging/discharging while the tray is inserted. In particular, it is preferable that the non-combustible blocking means is automatically closed when the tray is put in for charging/discharging and is automatically opened when charging/discharging is completed.

In addition, although the blocking means may be in the form of a door, it is preferable to be configured as non-flammable curtains (26a, 26b) as shown in FIGS. 6 and 7. The non-flammable curtains 26a and 26b may be designed to be opened and closed vertically or horizontally, but being vertically opened and closed is preferable. In this case, if a magnet (not shown) is provided at the lower end of the curtain, a stable sealed state may be formed, which is preferable. On the other hand, the non-flammable fabric can be used arbitrarily selected from those known in the art, such as flame-retardant woven fabric or non-woven fabric without particular limitation, and thus detailed description thereof will be omitted here.

The non-flammable curtain as the blocking means as described above can be installed inexpensively and simply, can efficiently block the inside of the charger/discharger from the outside as shown in FIG. 7, to thereby maintain the inside at a uniform temperature without being influenced by the outside temperature deviation during the activation process. Further, when a fire occurs, the non-flammable curtain shows an excellent effect of preventing the fire from spreading to the outside.

In addition, the present invention is further characterized in that the air-conditioning line 21 and the $CO_2$ supply line 22 connected to the inside of the box-shaped body 23 as described above are further provided. Herein, the air conditioning line 21 supplies a temperature controlled air to the inside of the body 23 and functions to independently adjust the temperature inside the charger/discharger, and when a fire occurs, the CO2 supply line 22 functions to extinguish the fire by injecting carbon dioxide into the body.

Figure 8:
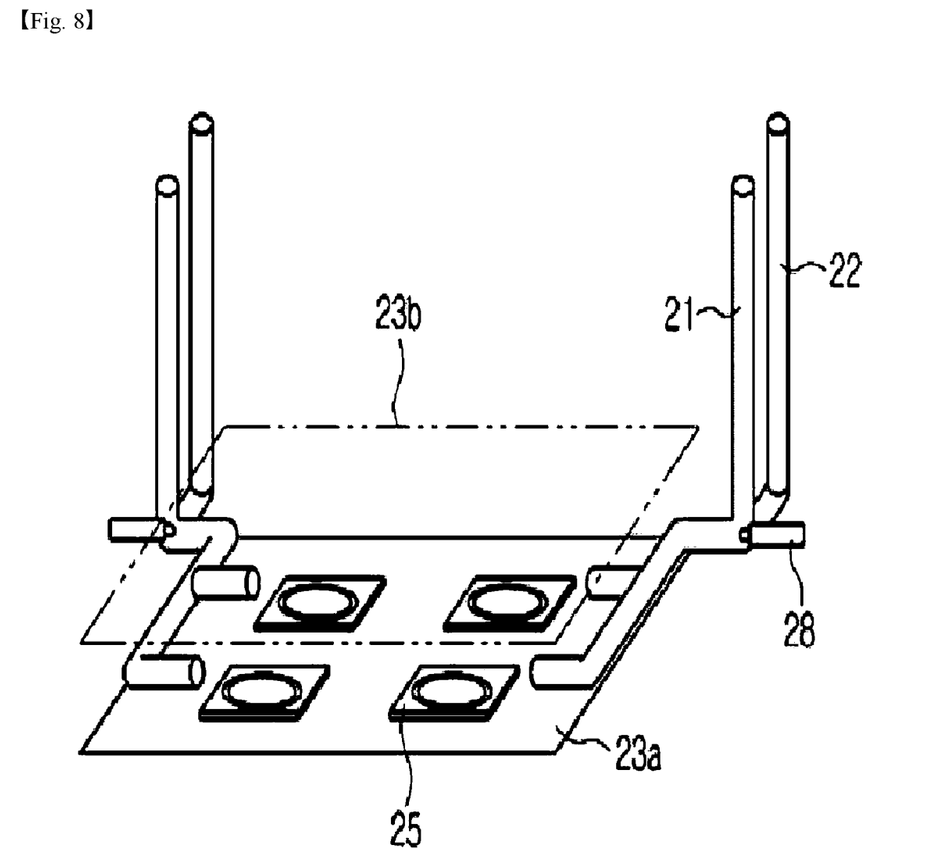
FIG. 8 is a perspective view showing in detail an example of a configuration of an air conditioning line and a $CO_2$ supply line in a charger/discharger according to a preferred embodiment of the present invention.
Figure 9:
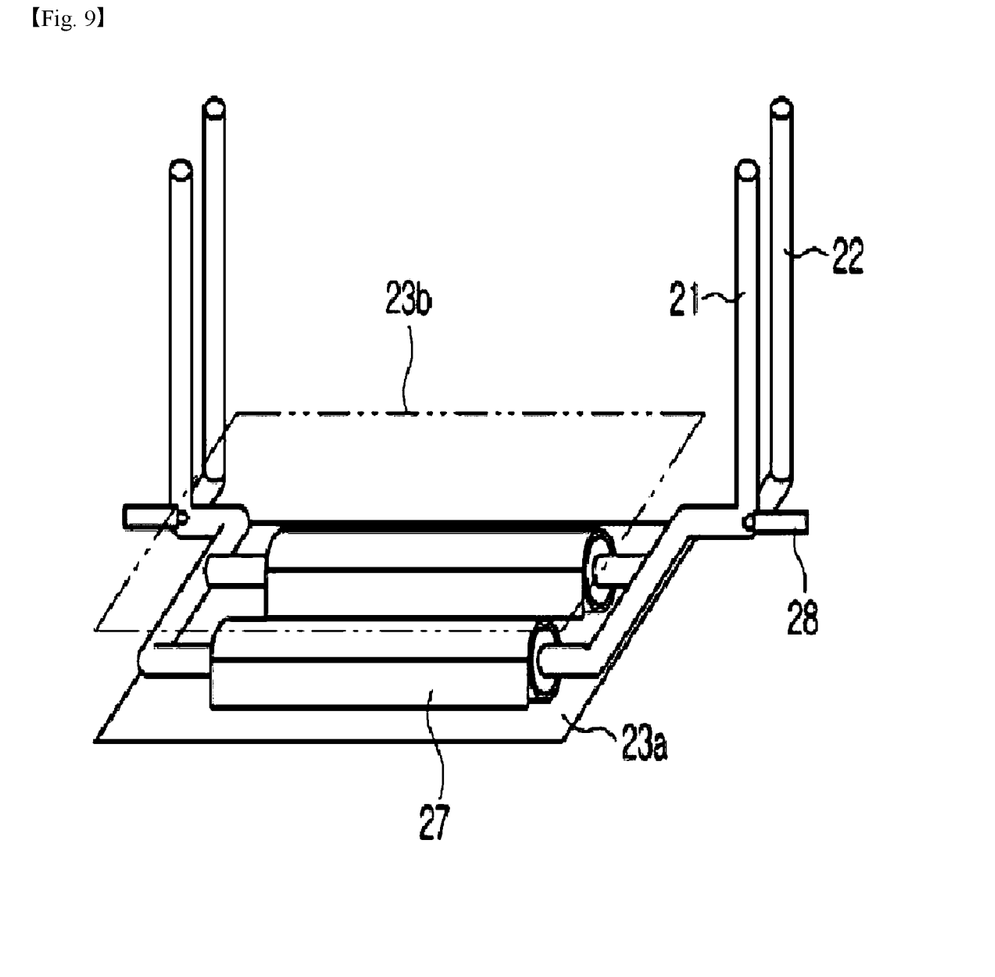
FIG. 9 is a perspective view showing in detail another example of a configuration of an air conditioning line and a $CO_2$ supply line in a charger/discharger according to another preferred embodiment of the present invention.

FIGS. 8 and 9 are perspective views showing in detail an exemplary configuration of an air conditioning line and a $CO_2$ supply line in a charger/discharger according to a preferred embodiment of the present invention, respectively, and schematically show part of the configuration in a state that two chargers/dischargers 20 are arranged up and down. Referring to these drawings, the ceiling 23a of the box-shaped body 23 is provided with a flat fan 25 or blow fan 27 similarly to the prior art, while an air conditioning line 21 and a CO2 supply line 22 connected to the inside through the ceiling 23a are additionally provided, and the air conditioning line 21 and the $CO_2$ supply line 22 are configured to join one line through an automatic open-close valve 28 before being introduced into the body 23. The automatic open-close valve 28 is normally in an open state of the air conditioning line 21, but when a fire occurs, the air conditioning line 21 is closed and is operated to open the $CO_2$ supply line 22.

The flat fan 25 or the blow fan 27 allows the air supplied through the air conditioning line to be smoothly supplied to the inside of the charge/discharge device. When the blow fan 27 is used, it is preferable to connect the air conditioning line 21 and the $CO_2$ supply line 22 to the intake port of the blow fan, so that the temperature control and the fire extinguishing can be performed more smoothly. The blow fan 27 may be installed in various numbers according to the size of the apparatus, but it is generally preferable to install about 2 to 4 blow fans.

As described above, the charger/discharger of the present invention includes an air conditioning line 21 and a $CO_2$ supply line 22, and these lines are controlled by an automatic open-close valve 28, so that the temperature inside the charger/discharger can be controlled uniformly and smoothly, and when a fire occurs, the $CO_2$ supply line can be opened to perform extinguishing work immediately and efficiently.

As described above in detail, a charger/discharger of a secondary battery and an activation process apparatus including the same according to the present invention may reduce the measurement deviation of a process due to the temperature deviation by uniformly controlling the internal temperature to a predetermined temperature, and in the event of a fire, it has the effect of extinguishing the fire efficiently and preventing it from spreading to the outside, which is very useful industrially.

While the present invention has been particularly shown and described with reference to exemplary embodiments thereof, it is to be understood that the invention is not to be limited to the details thereof, and it will be apparent to those skilled in the art that various modifications such as the above description, substitutions of components and the like, addition of additional components, and the like may be made without departing from the scope of the present invention based on the above description.

DESCRIPTION OF SYMBOLS

10: activation process chamber
20: charger/discharger
21: air conditioning line
22: $CO_2$ supply line
23: box-shaped body
23a: ceiling portion
23b: bottom portion
24a, 24b: charge/discharge terminal
25: flat fan
26a, 26b: non-flammable curtain
27: blow fan
28: automatic open-close valve
30: stacker crane
40: stacker crane moving passage
50: air conditioning duct
60: $CO_2$ source
10: activation process chamber
110: conventional charger/discharger
111: box-shaped body
112: charge/discharge terminal
113: fan
120: air conditioning duct
130: stacker crane

The invention claimed is:

1. A charger/discharger of a secondary battery, the charger/discharger comprising:
a body including:
a ceiling portion;
a bottom portion;
a side portion extending between the ceiling portion and the bottom portion, the side portion including two openings;
a charge/discharge terminal configured to apply an electric current when contacting an electrode lead of a battery cell when a tray having a plurality of battery cells loaded thereon is provided at the side portion of the body;
a non-combustible blocker at each of the openings of the side portion to open and close each of the openings of the side portion; and
an air conditioning line connected to an inside of the body to control a temperature of the charger/discharger; and
a $CO_2$ supply line to inject $CO_2$ into the body when a fire occurs.

2. The charger/discharger of claim 1, wherein the non-combustible blocker is configured to automatically close when a tray is input for charging/discharging of a secondary battery and is configured to automatically open when charging/discharging is completed.

3. The charger/discharger of claim 1, wherein the non-flammable blocker is a non-flammable curtain.

4. The charger/discharger of claim 3, wherein the non-flammable curtain is configured to open and close in a vertical direction.

5. The charger/discharger of claim 4, wherein the non-flammable curtain includes a magnet at a lower end of the non-flammable curtain.

6. The charger/discharger of claim 1, wherein the air conditioning line and the $CO_2$ supply line are configured to be joined into one line through an open-close valve, the one line being in communication with the inside of the body.

7. The charger/discharger of claim 6, wherein the open-close valve is an automatic open-close valve configured to, when a fire occurs, close the air conditioning line and open the $CO_2$ supply line by sensing the fire.

8. The charger/discharger of claim 1, further comprising a fan installed in the ceiling portion of the body.

9. The charger/discharger of claim 8, wherein the fan is a blower fan.

10. The charger/discharger of claim 9, wherein the air conditioning line and the $CO_2$ supply line are connected to an intake port of the blower fan.

11. An activation process apparatus of a secondary battery, comprising: a charger/discharger set in which two or more chargers/dischargers of the secondary battery according to claim 1 are arranged;
an air conditioning device connected to the air conditioning line of each of the chargers/dischargers to control a temperature; and
a $CO_2$ supply source connected to the $CO_2$ supply line of each of the chargers/dischargers to inject $CO_2$ when a fire occurs.

12. The charger/discharger of claim 1, wherein the openings are on different sides of the side portion than the charge/discharge terminal.

13. The charger/discharger of claim 1, wherein the $CO_2$ supply line is connected to the inside of the body.

* * * * *